(12) United States Patent
Tritt et al.

(10) Patent No.: US 11,041,373 B2
(45) Date of Patent: Jun. 22, 2021

(54) BRINE MANAGEMENT SYSTEM FOR SALT CAVERN DEVELOPMENT AND OPERATIONS

(71) Applicant: Caverneer Holdings LLC, Yardley, PA (US)

(72) Inventors: Michael John Tritt, Yardley, PA (US); Melvin Charles Reichwein, Richmond, TX (US)

(73) Assignee: Caverneer Holdings LLC, Yardley, PA (US)

( * ) Notice: Subject to any disclaimer, the term of this patent is extended or adjusted under 35 U.S.C. 154(b) by 33 days.

(21) Appl. No.: 16/297,701

(22) Filed: Mar. 10, 2019

(65) Prior Publication Data

US 2019/0284918 A1 Sep. 19, 2019

Related U.S. Application Data

(60) Provisional application No. 62/642,364, filed on Mar. 13, 2018.

(51) Int. Cl.
| | |
|---|---|
| *E21B 43/28* | (2006.01) |
| *B09B 1/00* | (2006.01) |
| *C02F 1/52* | (2006.01) |
| *B09C 1/02* | (2006.01) |

(52) U.S. Cl.
CPC .............. *E21B 43/28* (2013.01); *B09B 1/008* (2013.01); *B09C 1/02* (2013.01); *B09C 2101/00* (2013.01); *C02F 1/52* (2013.01)

(58) Field of Classification Search
CPC . B09C 1/02; B09B 1/008; E21B 43/28; C01F 1/52; C01F 1/04; C01F 1/265; C01F 1/4604; C01F 1/38; C01F 2001/5218; C01F 2103/10
See application file for complete search history.

(56) References Cited

U.S. PATENT DOCUMENTS

| | | | | |
|---|---|---|---|---|
| 3,386,768 | A * | 6/1968 | Jacoby | E21B 43/281 299/4 |
| 7,097,386 | B2 | 8/2006 | Maduell et al. | |
| 9,895,728 | B2 | 2/2018 | Kondo et al. | |
| 2006/0150892 | A1* | 7/2006 | Mayer | B01D 61/025 117/2 |
| 2009/0309408 | A1* | 12/2009 | Bishop | F16L 9/19 299/5 |
| 2011/0214257 | A1* | 9/2011 | Bakkenes | C01D 3/14 23/303 |
| 2016/0361741 | A1* | 12/2016 | Kondo | C02F 1/52 |

* cited by examiner

*Primary Examiner* — Sunil Singh
(74) *Attorney, Agent, or Firm* — LaMorte & Associates P.C.

(57) ABSTRACT

A system and method of creating, operating and maintaining a hydrocarbon storage facility in a salt cavern within an underground salt deposit. The system is portable and can be transported to areas near different well heads. The portability also enables adjacent well heads to be worked in succession to create a large storage cavern by interlinking a series of smaller caverns. This formation processes ensures that a storage cavern can be isolated within the confines of a salt deposit. Using the same portable equipment, the system can be configured to form a salt cavern, displace stored material out of a salt cavern, and repair or maintain a salt cavern well.

5 Claims, 4 Drawing Sheets

BRINE MANAGEMENT SYSTEM FOR SALT CAVERN DEVELOPMENT AND OPERATIONS

RELATED APPLICATIONS

This application claims the benefit of U.S. Provisional Patent Application No. 62/642,364, filed Mar. 13, 2018.

BACKGROUND OF THE INVENTION

1. Field Of The Invention

In general, the present invention relates to systems and methods for creating, operating and maintaining underground caverns in naturally occurring salt deposits. More particularly, the present invention relates to the management of processing fluids that are injected into salt caverns to create, expand, and maintains such caverns.

2. Prior Art Description

There are many locations around the world where underground deposits of various mineral salts and sea salts exist. Often, these deposits are mined, therein leaving caverns in the deposits. The caverns are lined with salt and stone. It has long been discovered that such caverns are very useful in storing hydrocarbons, such as crude oil and natural gas. Hydrocarbons do not dissolve the salts or the stone lining of the caverns. Furthermore, caverns in salt deposits can be quite voluminous. Consequently, caverns in salt deposits are useful to store very large deposits of hydrocarbons for long periods of time.

Many salt deposits are very deep in the earth or are otherwise impractical to mine. As such, technologies have been developed to form caverns in salt deposits without the use of mining excavation. Such prior art techniques involve drilling a well shaft into a salt deposit and injecting water into the salt deposit. The water dissolves the salt, therein leaving a cavern in the salt. The salt water is removed through the well shaft and is disposed of as waste water. Such prior art cavern forming techniques are exemplified by U.S. Pat. No. 7,097,386 to Maduell.

Salt-laden waste water is traditionally disposed of through the use of an evaporation pond, as a manufacturing feedstock, by being dispersed offshore, or through the use of a waste water injection well. All these disposal techniques have associated costs and administrative problems. For example, evaporation ponds require the use of a large allocation of land, the proper ambient environmental conditions, and a favorable regulatory environment. As such, evaporation ponds are not practical for most applications. Off shore disposal requires access to waterways, as well as considerable storage and transportation costs. Likewise, the use of waste water injection wells, requires land of the proper geology and a favorable regulatory environment. Accordingly, the use of waste water injection wells is also limited in its applications.

In the prior art, systems have been created that recycle brine water created during the formation of a salt cavern, therein removing the need to dispose of the waste water. These systems utilize industrial desalination facilities to at least partially desalinate the waste water. The partially desalinated water is then reinjected back into the cavern. Such prior art systems are exemplified by U.S. Pat. No. 9,895,728 to Kondo.

Traditional salt cavern management systems that rely upon industrial desalination plants to operate have inherent problems. Industrial desalination plants are not portable. Furthermore, they are difficult and expensive to construct given the regulatory environments of local, state and federal authorities. When constructed, an industrial desalination plant is preferably built at or near the well heads. This is often impractical, uneconomical and/or impossible due to various environmental and regulatory factors. Accordingly, the waste water from a cavern drill site must be shipped to a remote desalination plant for processing. This severely limits the rate at which a salt cavern can be constructed and greatly increases the associated costs.

Due to the complex logistics of moving and processing waste water from a well head to a desalination plant, only a limited number of well heads are typically used in forming salt caverns. When a large cavern is formed in a salt deposit by a single well head, a danger exists that the salt cavern being created may extend beyond the boundaries of the salt deposit and into the surrounding rock. Although caverns encased in a salt deposit can readily be made leakproof, caverns in rock cannot. To avoid this problem multiple caverns are leached in series using multiple well heads. The brine from a first well head will enter an adjacent wellhead/cavern. The brine becomes increasingly saturated so that when the brine solution exits the last cavern the brine is fully saturated. This maximizes the efficiency of the system.

Furthermore, in prior art systems that recycle brine water, the brine drawn from the salt cavern is only partially desalinated before it is reinjected and reused. This is done to lower costs and to slow the formation rate of the salt cavern. Partially desalinated water only has the ability to dissolve a limited amount of additional salt. Slow cavern formation is critical in the prior art.

Once a salt cavern is formed, it is filled with a hydrocarbon gas or liquid. In order to retrieve the hydrocarbon from the salt cavern, brine water must be reintroduced into the salt cavern to displace the hydrocarbon out of the salt cavern. Since the industrial desalination facilities of prior art systems are typically not on the site of the well heads, large volumes of brine water must be stored or otherwise transported to the well heads. This transportation must be repeated each time hydrocarbons are added to the salt cavern or removed from the salt cavern. This adds significant costs to the day-to-day operations of the storage facility.

A need therefore exists for an improved salt cavern brine management system that is mobile and can be moved from location to location for creating salt caverns without having to transport wastewater. A need also exists for an improved salt cavern management system that can be used to form localized salt caverns quickly and then be moved to adjacent positions to form a higher quality cavern in less time. Lastly, a need exists for a dynamic salt cavern brine management system that can be used to create a salt cavern, receive and inject saturated displacement brine from and into hydrocarbon liquid storage caverns without the need for brine disposal or brine storage ponds or tanks, and maintain a salt cavern. These needs are met by the present invention system as described and claimed below.

SUMMARY OF THE INVENTION

The present invention is a system and method of creating and maintaining a hydrocarbon storage facility in a salt cavern within an underground salt deposit. The system is portable and can be transported to areas near different well heads. The portability also enables adjacent well heads to be worked in parallel and succession to create a multiple storage caverns by cascading the brine through a series of smaller caverns. This helps regulate the cavern development and maintain a storage cavern within the confines of a salt deposit.

The primary components of the system include an injector pump, a brine crystallizer, and a brine filter. The system can be configured to create a salt cavern, maintain a salt cavern, and to manage levels of liquid hydrocarbons stored within the salt cavern. In the configuration to create a salt cavern, a well is advanced into an underground salt deposit. Fresh water is injected into the well. The fresh water dissolves some of the salt deposit, therein creating produced brine and a growing salt cavern in the salt deposit. The well brine is drawn out of the well and is filtered to remove undissolved solids. The filtered brine is then pumped to a brine crystallizer. The brine crystallizer separates the filtered brine into fresh water and solid salt. The fresh water is recycled back into the cavern for continued salt dissolution. The solid salt is stored, disposed of, or commercialized.

When configured to manage levels of liquid hydrocarbons stored within the salt cavern, the stored salt is mixed with water to produce saturated brine. The reconstituted brine is pumped into the salt cavern to displace any hydrocarbon stored within the salt cavern. The displaced hydrocarbon is removed and utilized. When a hydrocarbon is injected into the salt cavern, the brine is displaced. The displaced brine is processed in the same manner as brine removed from the salt cavern during the formation of the salt cavern, wherein the displaced brine is processed into streams of fresh water and crystallized salt.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention salt cavern management system can be configured in multiple ways, only a few exemplary embodiments are illustrated. The exemplary configurations are being shown for the purposes of explanation and description. The exemplary configurations set forth some of the best modes contemplated for the operations of the system. The illustrated configurations, however, are merely exemplary and should not be considered limitations when interpreting the scope of the appended claims.

Figure 1:
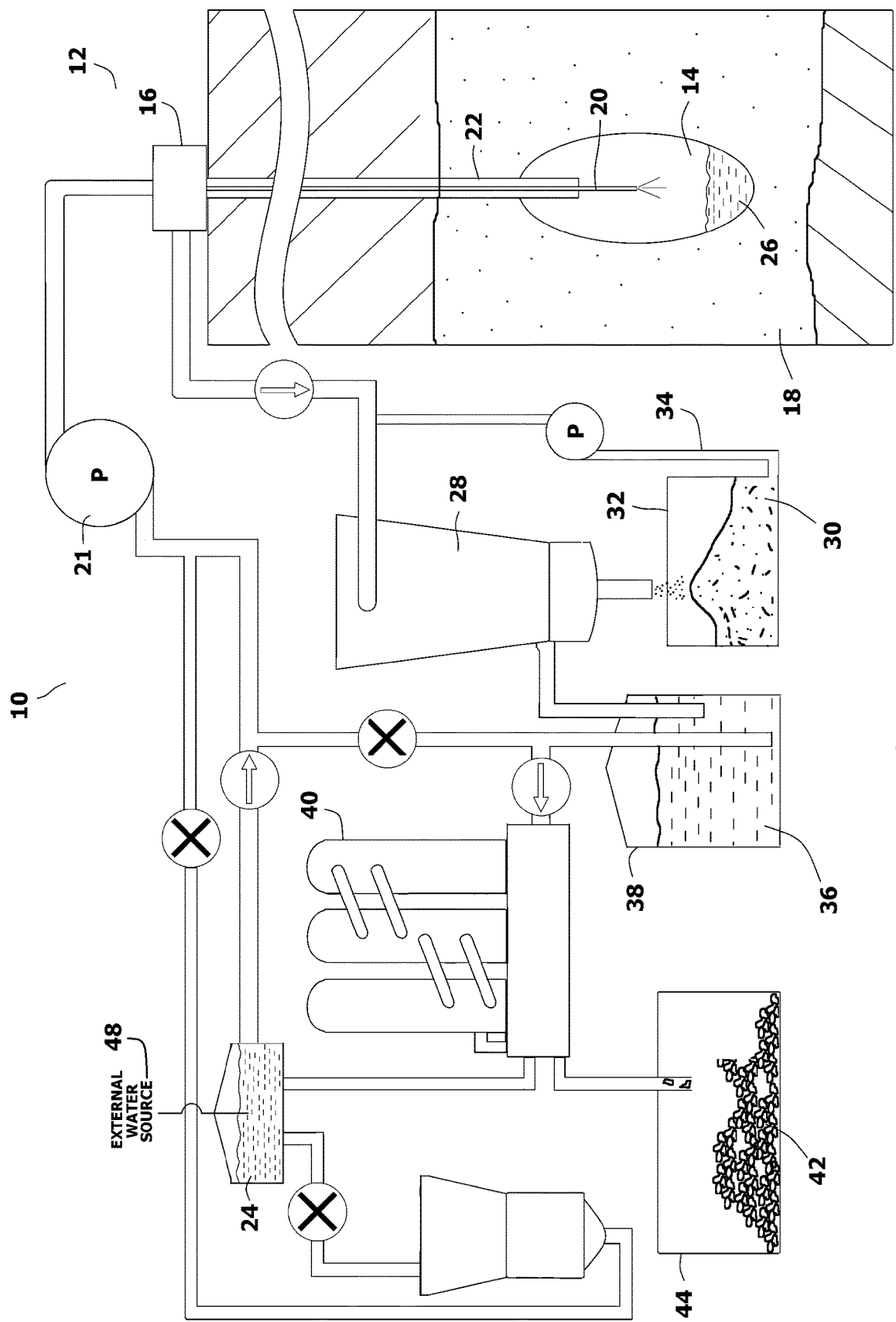
FIG. 1 is a schematic that shows an exemplary embodiment of a salt cavern management system configured to produce a salt cavern.

Referring to FIG. 1, a schematic of the present invention salt cavern management system 10 is shown. In FIG. 1, the salt cavern management system 10 is set in a first configuration 12 for forming an initial salt cavity 14 that will be enlarged into a storage cavern. To form a salt cavity 14, a well 16 is drilled into the earth in a traditional manner. The well 16 is advanced into a salt deposit 18 within the earth. The well 16 is lined with a casing 22 and an injection pipe 20 is advanced through the casing 22 and into the salt deposit 18. Fresh water 24 is injected into the salt deposit 18 through the injection pipe 20 or the open annulus between the injection pipe 20 and the casing 22 using an injection pump 21. The fresh water 24 dissolves the salt deposit 18, therein creating well brine 26 and a growing salt cavity 14 in the salt deposit 18. The well brine 26 is extracted as it flows out between the casing 22 and the injection pipe 20. This formation process continues until the initial salt cavity 14 is formed in the salt deposit 18.

The well brine 26 exiting the well 16 contains water, dissolved salt, salt crystals, rock particles, dirt and various other materials that are trapped in the salt deposit 18. As this material is flushed out of the well 16 with the well brine 26, the solid contaminates are filtered out. The filtering is preferably performed by mechanically filtering equipment 28, such as series hydrocyclone separator. Such mechanically filtering equipment 28 can run continuously while the salt cavern 14 is being formed. Furthermore, such mechanically filtering equipment 28 does not utilize replaceable catch screens or filter cartridges that would have to be disposed of as hazardous waste. The mechanically filtering equipment 28 is readily mountable to a flatbed truck and can be transported from place-to-place as needed.

The mechanically filtering equipment 28 creates solid waste 30. The solid waste 30 is held in a disposal tank 32, wherein liquid runoff that settles from the disposal tank 32 can be collected and reinjected into the produced brine stream 26 via a recycling loop 34. The remaining solid waste 30 in the disposal tank 32 can be trucked away as solid landfill waste.

Filtered brine 36 exits the filtering equipment 28. A volume of the filtered brine 36 is passed through an atmospheric brine reservoir 38 to allow gases to evolve. The atmospheric brine reservoir 38 can be a storage tank or pond that is constructed on-site.

A salt crystallizer 40 that contains a vapor-compression evaporator is provided on-site. The salt crystallizer 40 can be truck-borne or can be constructed on-site from a few truck-movable components. The salt crystallizer 40 separates the vast majority of the salt dissolved within the filtered brine 36. The result is fresh water 24 and solid salt 42. The fresh water 24 has a salt content of 50 ppm or less and meets potability standards. The solid salt 42 is stored in a storage depot 44, where it can be readily shipped away to a buyer or retrieved to make saturated brine for ongoing operations. Since the filtered brine 36 used to make the salt 42 was prefiltered, the salt 42 has a high purity level and can be sold as a commodity. As such, the solid salt 42 need not be disposed of as solid waste.

Fresh water 24 is generated by the salt crystallizer 40 and is recovered. The fresh water 24 is injected back into the well 16 using injection pumps 21. Additional fresh water is required during cavern creation to fill the increasing volume of the cavern 52 with fluid. The fresh water 24 supplied to the injection pump 21 is supplemented by an outside fresh water source 48. The fresh water source 48 can be well water, surface water or water from a municipal or commercial source.

As the salt 42 is separated from the filtered brine 36 in the salt crystallizer 40, the temperature of the recovered fresh water 24 is raised. Likewise, as the recovered fresh water 24 is fed through the injection pumps 21, the temperature is further raised. Due to the proximity of the system 10 to the well 16, the raised temperature of the fresh water 24 can be maintained and warm water can be injected into the well 16.

Since the fresh water 24 injected into the well was both fresh and heated, it rapidly dissolves the salt deposit 18. The dissolution of the salt continues until the injected water is either saturated with salt or displaced by fresher water. As such, the salt cavern management system 10, in the shown configuration, can rapidly grow the initial salt cavity 14 in the salt deposit 18.

Figure 2:
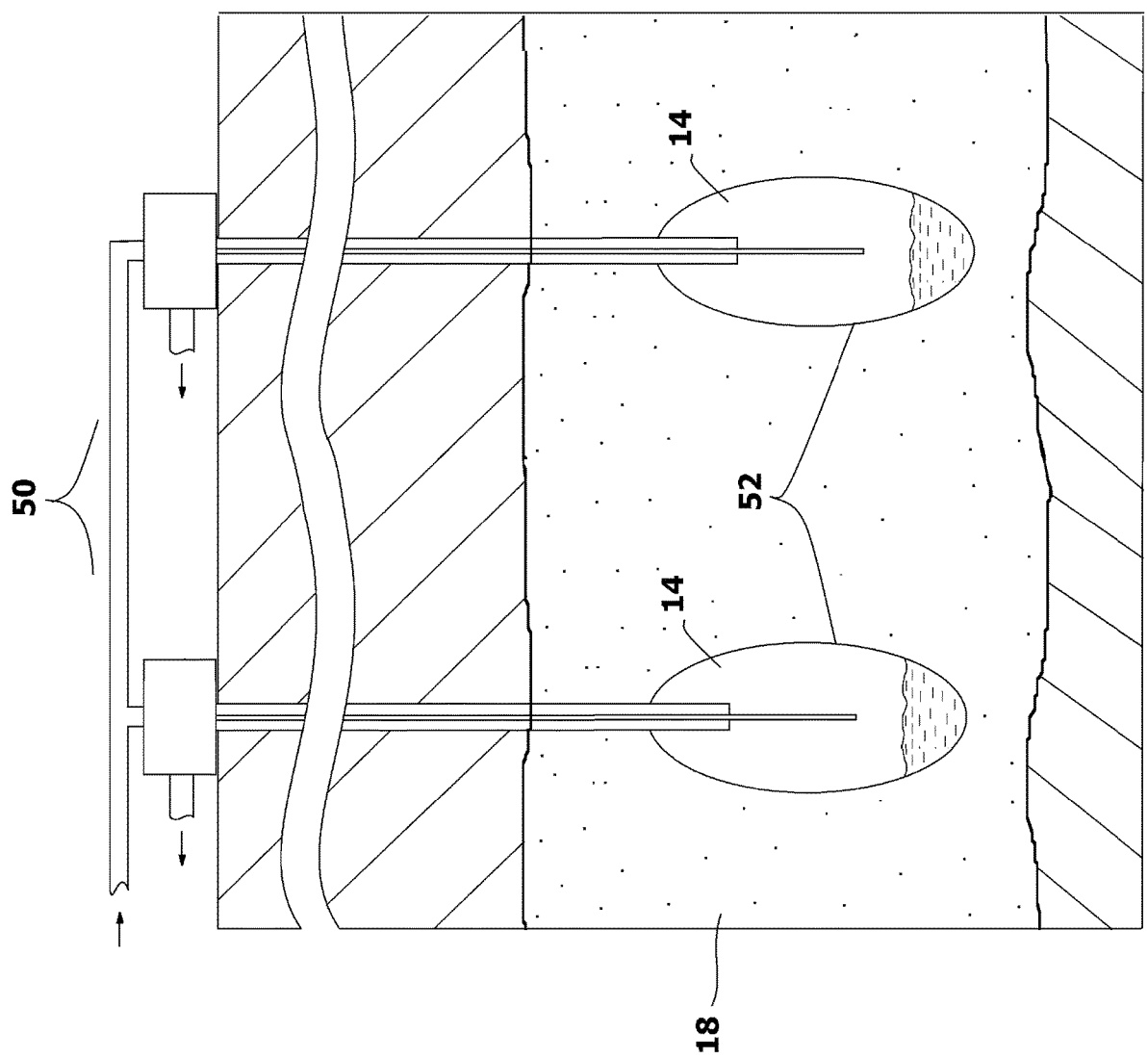
FIG. 2 shows a progression of smaller salt caverns made by the salt cavern management system of FIG. 1.

Referring to FIG. 2 in conjunction with FIG. 1, it can be seen that the initial salt cavity 14 can be grown into a larger salt cavern 52. This can be done by creating multiple cavities 14 in the salt deposit 18. Subsequent well heads 50 can be used to create a series of small cavities 14 that interlink to form one large cavern 52. Each of the small cavities 14 is made rapidly and is maintained within the confines of the salt deposit 18. The resulting large cavern 52 is therefore larger and more integrally sound than any one cavern that can be made from a single well, using prior art equipment and techniques.

The mobility of all the components enables multiple well heads 50 to be used to create one large cavern 52. The equipment can be moved to each well head 50 as the well head 50 is drilled. The small cavities 14 can be formed rapidly using the mobile equipment. As such, fewer administrative permits need to be obtained and fewer regulatory requirements apply.

Figure 3:
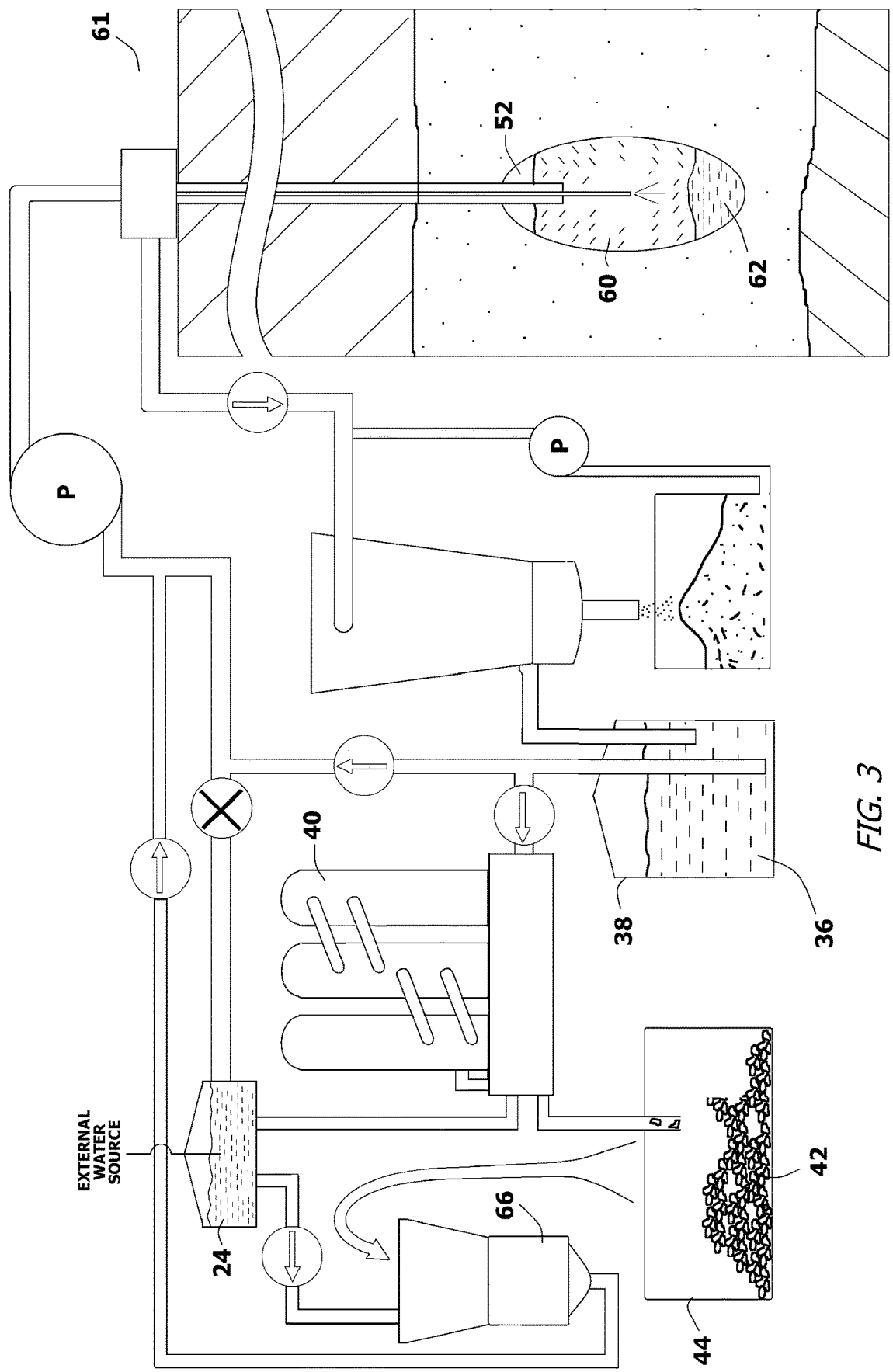
FIG. 3 is a schematic that shows an exemplary embodiment of a salt cavern management system configured to manage liquid hydrocarbon levels within a salt cavern.

Once a salt cavern 52 of a desired volume and shape is created, the salt cavern 52 can be filled with a hydrocarbon. The same salt cavern management system 10 can then be slightly reconfigured to displace the hydrocarbons out of the salt cavern 52. Referring to FIG. 3 in conjunction with FIG. 1, it can be seen that to displace a hydrocarbon 60 from the salt cavern 52, saturated brine 62 is injected into the salt cavern 52. The saturated brine 62 is heavier than the hydrocarbon 60 and displaces the hydrocarbon 60 out of the salt cavern 52. The saturated brine 62 injected into the salt cavern 52 must be cavern inert or saturated at cavern conditions. That is, the saturated brine 62 must contain the same salt as the salt deposit 18 and be saturated at the temperature of the salt cavern 52, without being supersaturated or undersaturated. If the saturated brine 62 is undersaturated, the brine can dissolve the salt cavern 52 and potentially enlarging the caverns at an uncontrolled rate. If the saturated brine 62 is supersaturated, salt solids may become deposited in the well or surface piping, therein impeding fluid flow.

In the cavern formation configuration, the filtered brine 36 in the brine reservoir 38 that is pumped out of the salt cavern 14 has the correct saturation level for reintroduction. This is because the filtered brine 36 in the holding tank reaches saturation in the environment of the salt cavern 52 and contains the same salt as is within the salt cavern 52. However, the volume of filtered brine 36 in the brine reservoir 38 is limited and would be insufficient to displace a significant percentage of hydrocarbons 60 from the salt cavern 52.

During the formation of the salt cavern 52, some filtered brine 36 is produced that is stored in the brine reservoir 38. Other filtered brine 36 is forwarded to the salt crystallizer 40 that separates the salt 42 from the fresh water 24. The salt 42 has the same chemical composition as the salt deposit 18, since the salt 42 came from the salt deposit 18. In FIG. 3, the salt cavern management system 10 is set into a displacement configuration 61 for the purpose of hydrocarbon 60 displacement. To displace the hydrocarbon 60, saturated brine 62 must be pumped into the well 16. To obtain the saturated brine 62, a mixer 66 is provided. Some salt 42 from the salt storage depot 44 is mixed with fresh water 24 within the mixer 66 to produce the saturated brine 62. The saturated brine 62 is then pumped into the well 16 using the injection pumps 21. The saturated brine 62 can be supplemented by the filtered brine 36 held in the brine reservoir 38. The benefit of manufacturing saturated brine 62 for displacement and crystallizing displaced brine is to reduce the required sized of the brine reservoir 38, which is very costly to construct and maintain and is subject to may environmental regulations and restrictions.

As the saturated brine 62 fills the salt cavern 52, the hydrocarbons 60 are displaced and are delivered to their end destination for use. When the salt cavern 52 is to be refilled with hydrocarbon 60, the configuration of the system is returned to that of FIG. 1. As the hydrocarbons 60 are pumped into the well 16, the saturated brine 62 is displaced and is treated in the same manner as the well brine produced during the initial formation of the salt cavern 52.

Figure 4:
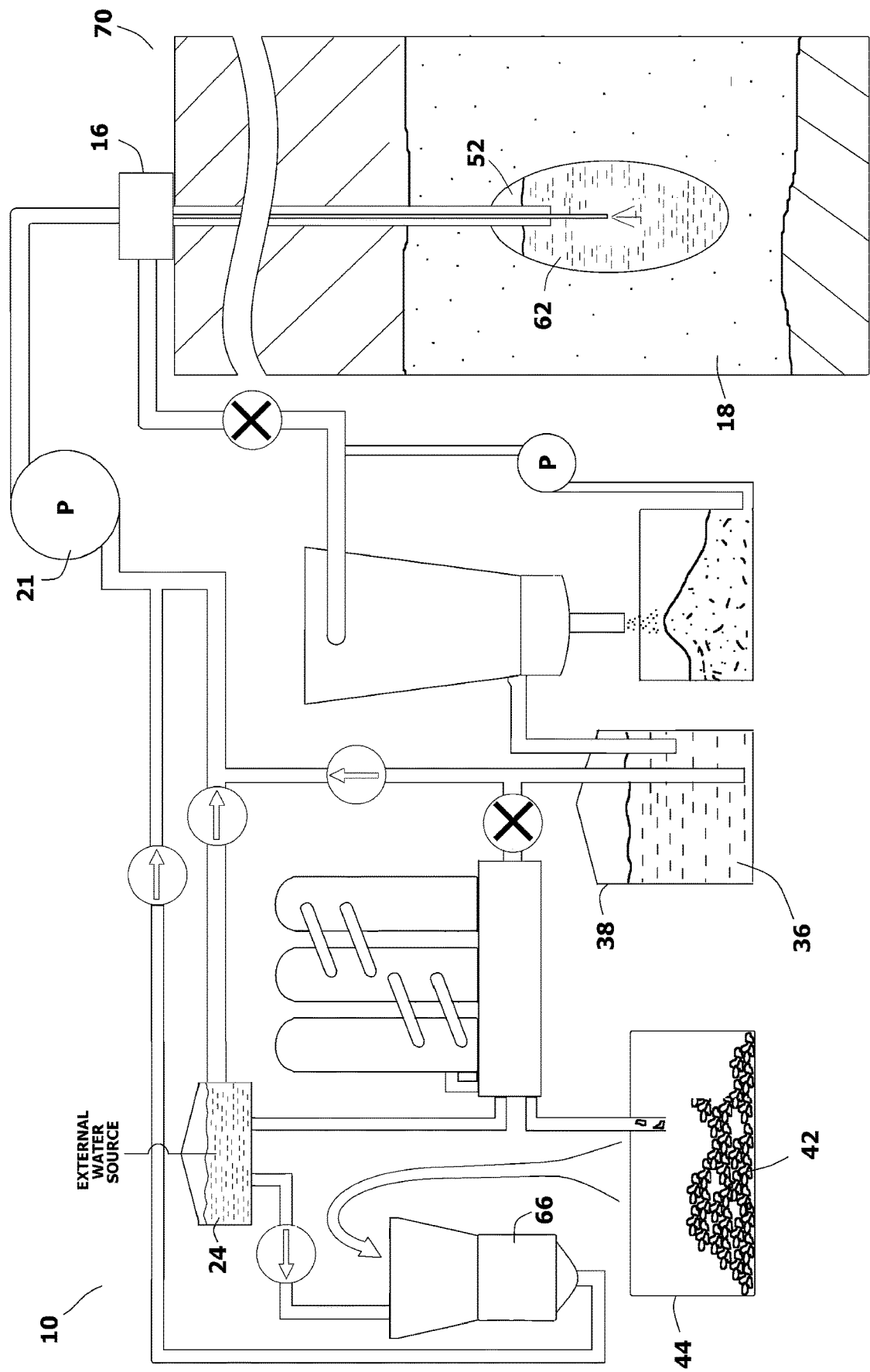
FIG. 4 is a schematic that shows an exemplary embodiment of a salt cavern management system configured to maintain a preformed salt cavern.

From time to time, the salt cavern well 16 must be maintained. If the salt cavern well 16 cannot hold pressure, it must be repaired. A configuration 70 of the salt cavern management system 10 used for maintenance and repair is shown in FIG. 4. The configuration is very similar to the displacement configuration used in FIG. 3. In the configuration 70 of FIG. 4, the salt cavern 52 is emptied of hydrocarbons. The salt cavern 52 is then filled with saturated brine 62. To obtain the saturated brine 62, some salt 42 from the salt storage depot 44 is mixed with fresh water 24 within the mixer 66. The saturated brine 62 is then pumped into the well 16 using the injection pumps 21. The saturated brine 62 can be supplemented by the filtered brine 36 held in the brine reservoir 38. The saturated brine 62 is pumped into the salt cavern 52 and allowed to reach equilibrium temperature and saturation conditions. These conditions enable the well 16 to be safely serviced and the cavern 14 and well system to be pressure tested for mechanical integrity. When the salt cavern 14 is to be refilled with hydrocarbons, the configuration of the salt cavern management system 10 is returned to that of FIG. 1. As the hydrocarbons are pumped into the well 16, the saturated brine 62 is displaced and is treated in the same manner as the well brine produced during the initial formation of the salt cavern 52.

Using a single on-site salt cavern management system 10, a salt cavern 52 can be created, operated and maintained in an economical manner and environmentally friendly manner. It will be understood that the configurations of the present invention that are illustrated and described are merely exemplary and that a person skilled in the art can make many variations to those configurations. All such embodiments are intended to be included within the scope of the present invention as defined by the claims.

What is claimed is:

1. A method of creating and maintaining a storage facility in a salt cavern within an underground salt deposit, said method comprising the steps of:
providing an injector pump;
providing a portable brine crystallizer;
providing a brine filter;
providing a mixer;
drilling a first well into said underground salt deposit;
utilizing said injector pump to inject fresh water into said salt deposit through said first well, wherein said fresh water dissolves some of said salt deposit creating brine and a first salt cavern in said salt deposit;
recovering salt from said first salt cavern by drawing said brine out of said first salt cavern, filtering said brine with said brine filter to create filtered brine and separating said salt from said filtered brine with said brine crystallizer, wherein said filtered brine is separated into said salt and said fresh water, wherein said fresh water is again injected into said salt deposit through said first well until said first salt cavern reaches a selected size within said salt deposit;

adding said salt and said fresh water to said mixer, wherein said mixer produces a reconstituted brine; and periodically injecting said reconstituted brine into said first salt cavern, resting said reconstituted brine in said first salt cavern to maintain said first salt cavern.

2. The method according to claim 1, further including providing an external fresh water source and adding auxiliary water from said external fresh water source to said fresh water.

3. The method according to claim 1, further including:

drilling a second well into said underground salt deposit adjacent said first well;

connecting said injector pump, said brine crystallizer, and said brine filter to said second well;

injecting said fresh water into said salt deposit through said second well, therein producing a second salt cavern in said salt deposit, wherein said second salt cavern interlinks with said first salt cavern in said salt deposit.

4. A method of performing maintenance on a salt cavern within an underground salt deposit that is accessible through a well head, said method comprising the steps of:

providing a mixer;

providing a brine crystallizer; providing a filter;

injecting water into said salt cavern to produce well brine, drawing said well brine from said salt cavern, and filtering said well brine with said filter to create filtered brine, separating salt from said filtered brine with said brine crystallizer to recover said salt;

periodically mixing said salt with water in said mixer to produce saturated brine;

injecting said saturated brine into said salt cavern through said well head for integrity testing of said salt cavern.

5. A method of recycling well brine recovered from a salt cavern within an underground salt deposit, said method comprising the steps of:

providing a brine crystallizer;

providing a mixer; providing a filter;

injecting water into said salt cavern to produce well brine;

drawing said well brine from said salt cavern and filtering said well brine with said filter to create filtered brine;

directing said filtered brine into said brine crystallizer, wherein said brine crystallizer separates salt from said filtered brine and produces said salt and fresh water;

periodically mixing said salt with said fresh water with said mixer to produce saturated brine; and injecting said saturated brine into said salt cavern to displace material stored within said salt cavern.

\* \* \* \* \*